Figure 1:
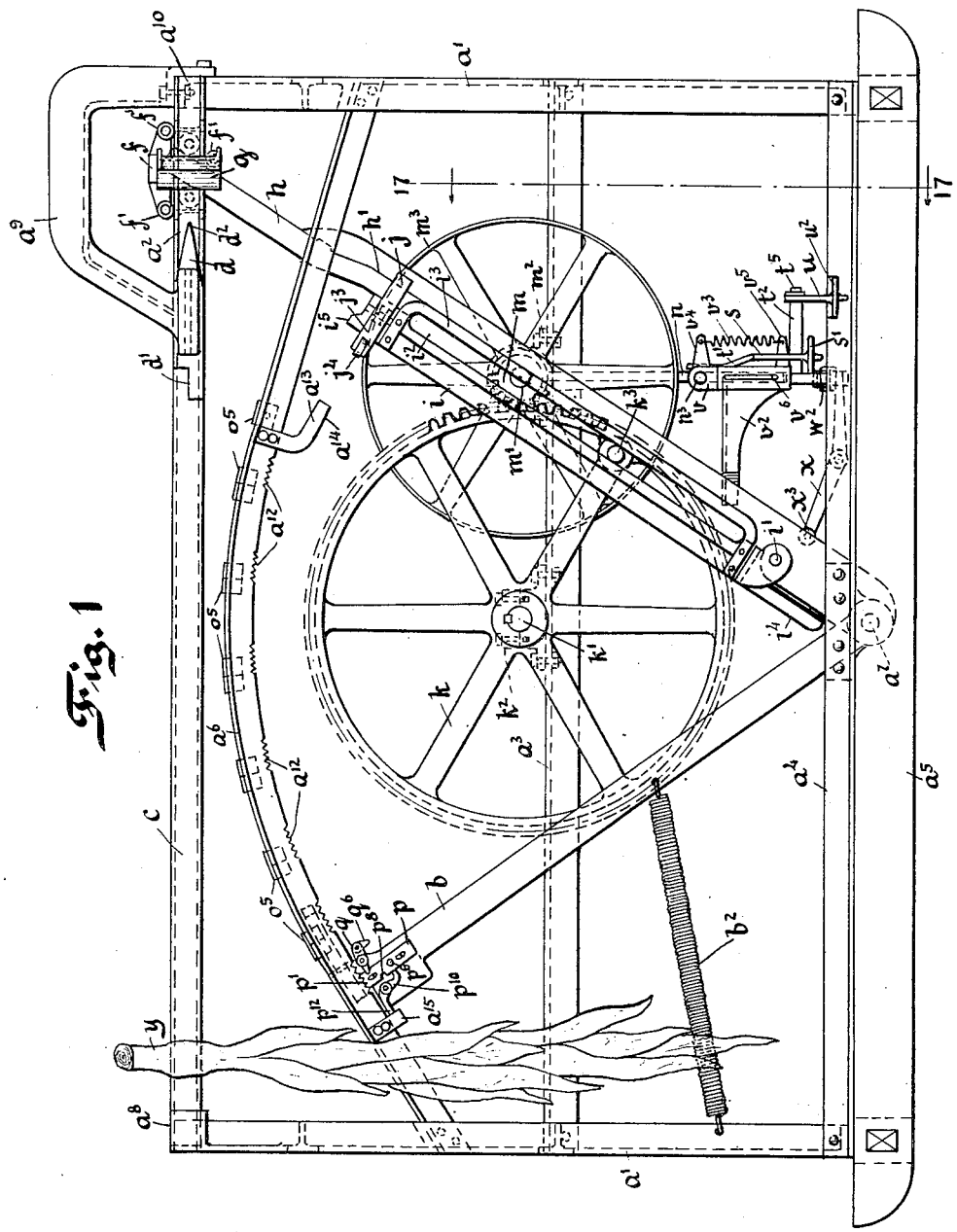

C. M. GULLICKSON.
TOBACCO SPEARING MACHINE.
APPLICATION FILED SEPT. 21, 1908.

945,717.

Patented Jan. 4, 1910.
8 SHEETS—SHEET 1.

WITNESSES:

Charles M. Gullickson, INVENTOR

BY

ATTORNEY

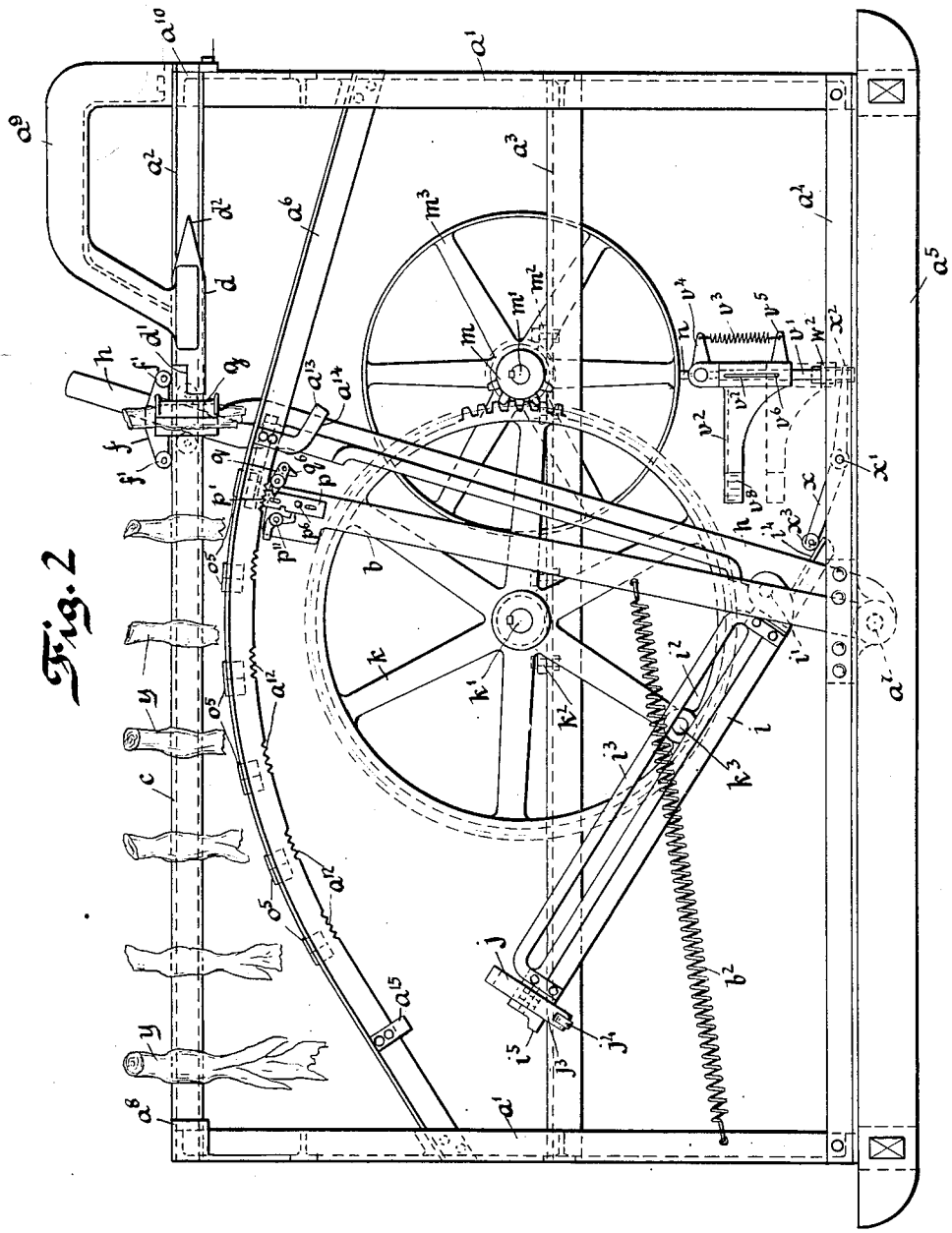

C. M. GULLICKSON.
TOBACCO SPEARING MACHINE.
APPLICATION FILED SEPT. 21, 1908.
945,717.
Patented Jan. 4, 1910.
8 SHEETS—SHEET 3.
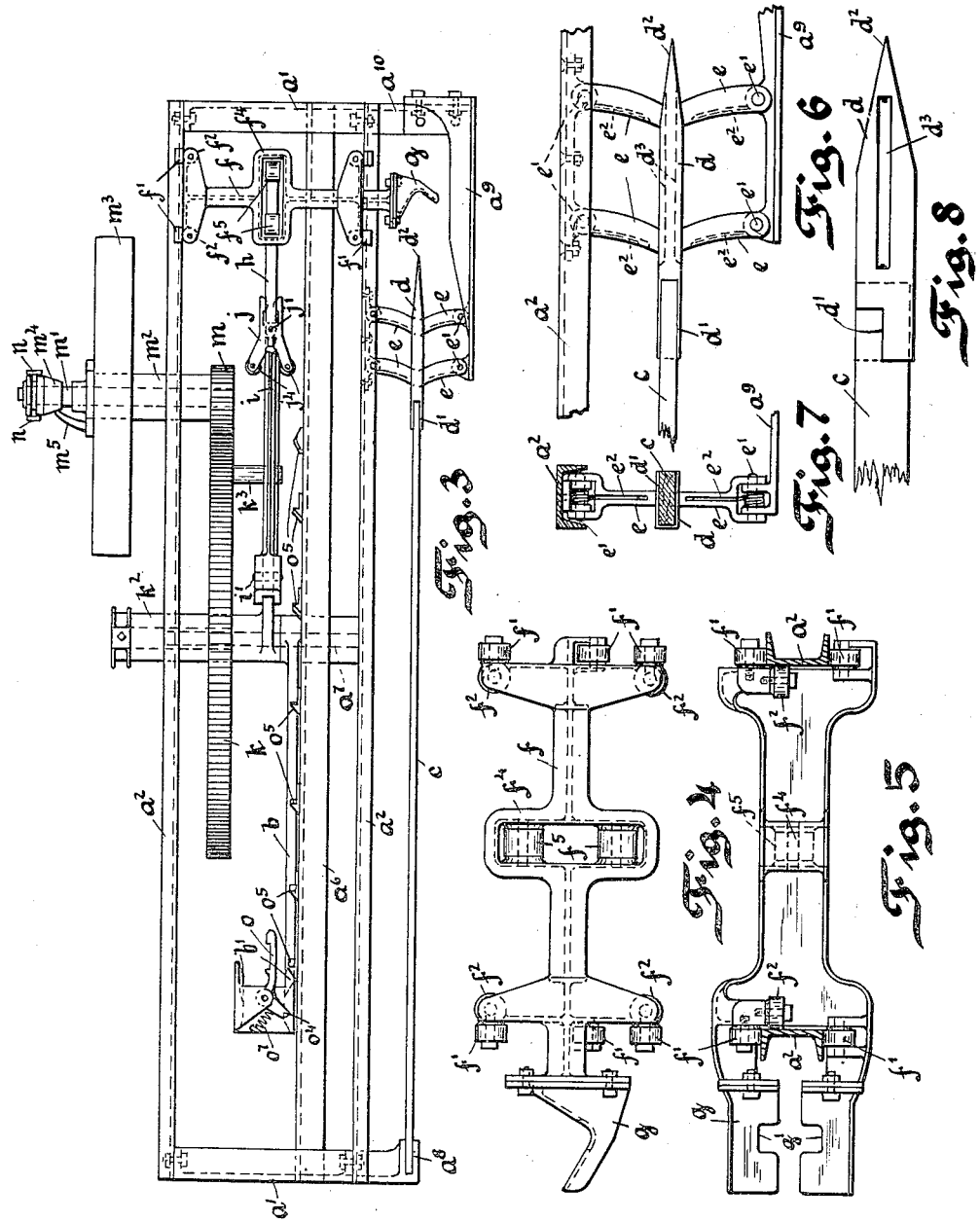
WITNESSES:
Charles M. Gullickson, INVENTOR
BY
ATTORNEY

C. M. GULLICKSON.
TOBACCO SPEARING MACHINE.
APPLICATION FILED SEPT. 21, 1908.

945,717.

Patented Jan. 4, 1910.
8 SHEETS—SHEET 4.

Chas. M. Gullickson, INVENTOR

WITNESSES:
A. P. Van Loghem
Minnie D. Schunbun

BY George Simore Colles
ATTORNEY

C. M. GULLICKSON.
TOBACCO SPEARING MACHINE.
APPLICATION FILED SEPT. 21, 1908.
945,717.
Patented Jan. 4, 1910.
8 SHEETS—SHEET 5.
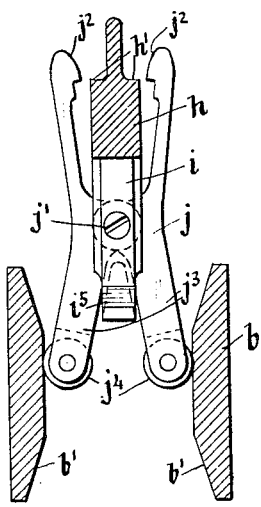
Fig. 13
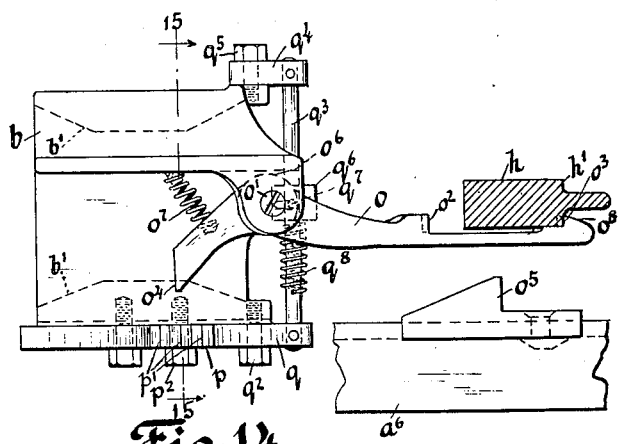
Fig. 14
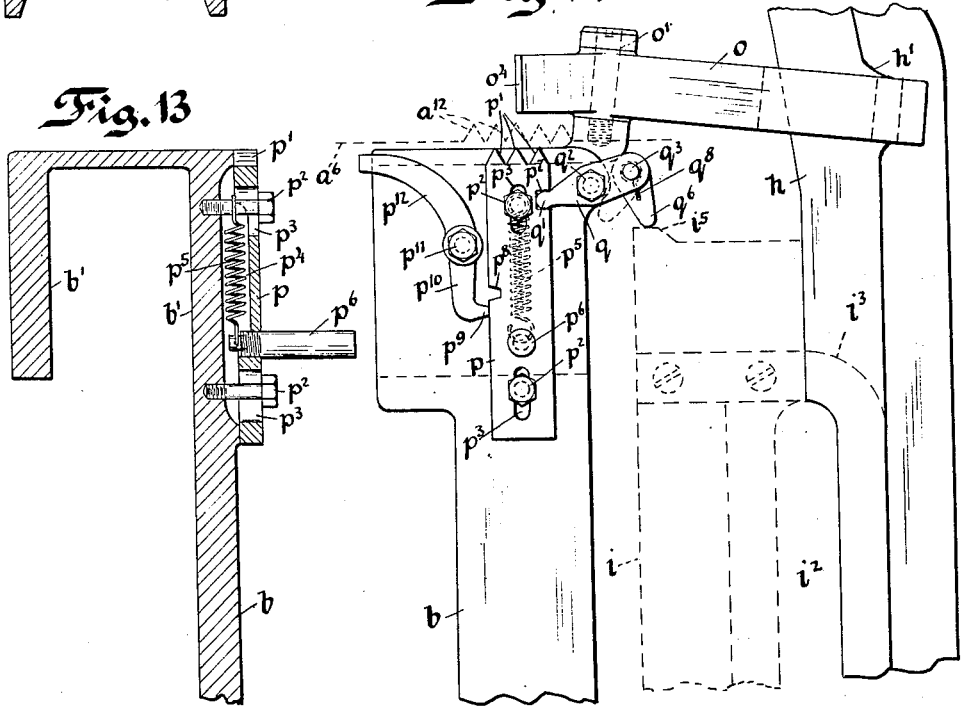
Fig. 15
Fig. 16
Charles M. Gullickson, Inventor
Witnesses

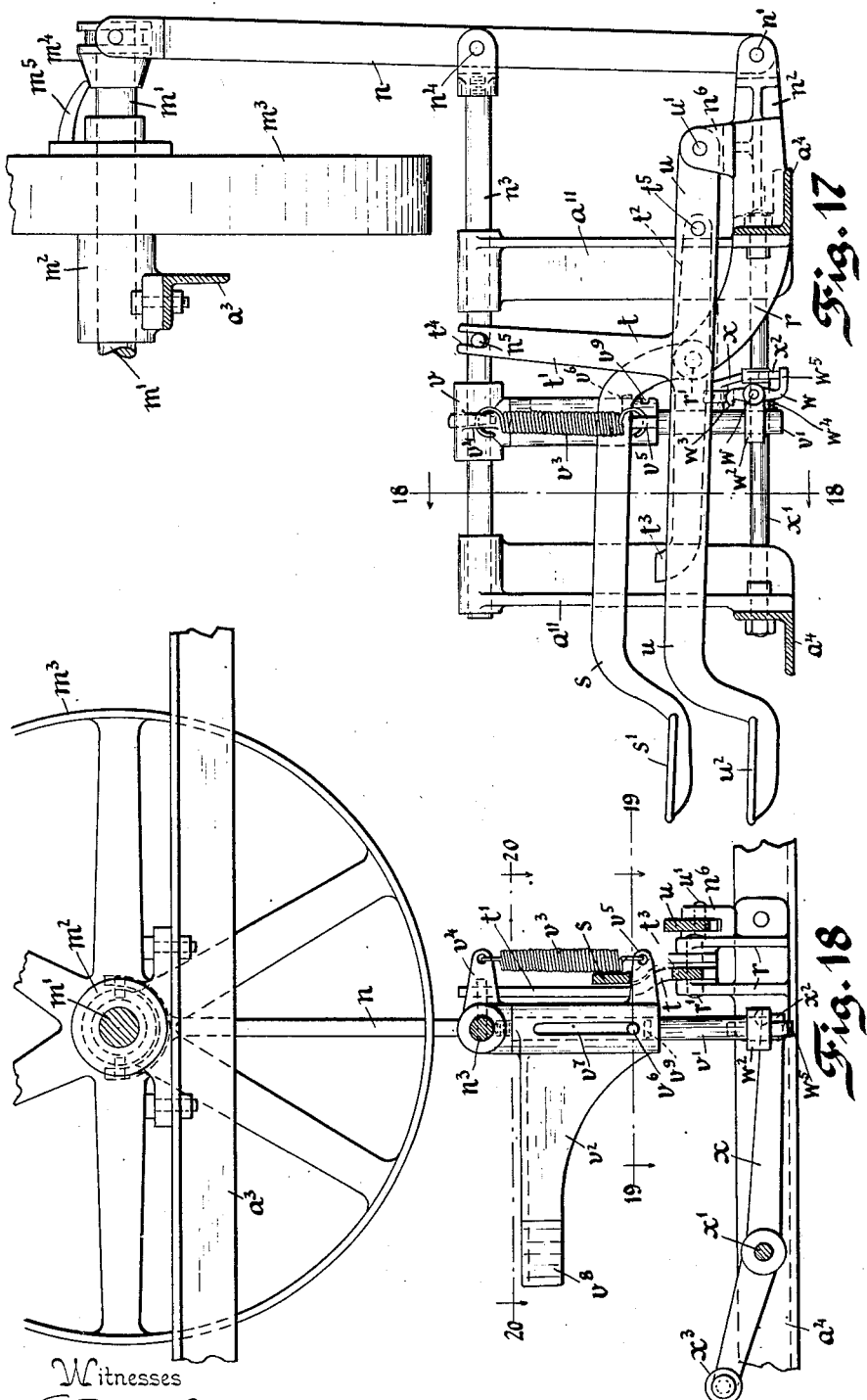

C. M. GULLICKSON.
TOBACCO SPEARING MACHINE.
APPLICATION FILED SEPT. 21, 1908.

945,717.

Patented Jan. 4, 1910.
8 SHEETS—SHEET 7.

Witnesses
A. P. Van Loghem
Minnie D. Schienlein

Charles M. Gullickson, Inventor
By George Whitmore Colles, Attorney

C. M. GULLICKSON.
TOBACCO SPEARING MACHINE.
APPLICATION FILED SEPT. 21, 1908.

945,717.

Patented Jan. 4, 1910.
8 SHEETS—SHEET 8.

Witnesses
G. P. VanLoghem.
Minnie D. Schumbein.

Charles M. Gullickson, Inventor
By George Wetmore Colles, Attorney

UNITED STATES PATENT OFFICE.

CHARLES M. GULLICKSON, OF MILWAUKEE, WISCONSIN, ASSIGNOR, BY DIRECT AND MESNE ASSIGNMENTS, OF ONE-SIXTH TO ALBERT KUENY, FOUR-SIXTHS TO J. W. SKINNER AND FRANK T. TERRY, AND ONE-SIXTH TO JOHN W. MUDROCH, ALL OF MILWAUKEE, WISCONSIN.

TOBACCO-SPEARING MACHINE.

945,717.  Specification of Letters Patent.  Patented Jan. 4, 1910.

Application filed September 21, 1908. Serial No. 454,033.

*To all whom it may concern:*

Be it known that I, CHARLES M. GULLICKSON, of Milwaukee, Wisconsin, have invented a Tobacco-Spearing Machine, of which the following is a specification.

My invention consists in a device for automatically spearing tobacco plants, or in other words of stringing them upon a lath at separated intervals so that they may be spread out to dry. This operation has heretofore been performed by hand, and so performed is a tedious and costly operation and injurious to the leaves of the plant. On each lath a certain number of plants have to be placed at regular intervals apart, the lath piercing the fibers of the stem of the plant.

The object of my invention is to produce a machine capable of performing the aforesaid operation entirely automatically, the plants as they are presented to the machine being taken by it and spread upon the lath at even distances apart, and the machine stopping automatically as soon as the lath in the machine has received its given quantum of plants, and to avoid any injury to the leaves.

I further aim to provide means for stopping the machine at any time during the operation and as an auxiliary attachment, means for transforming the machine into a delather, whereby the plants are removed from the laths.

My invention consists generally of a spear which forms a continuation of and a support for one end of the lath; a reciprocating pusher adapted to take each plant presented to it, impale it upon said spear-head, and deliver it upon the lath in its proper relation to the other plants; means for supporting said spear as to permit said plants to completely encircle the same and pass completely around the same without interrupting the support thereof at any time; means for properly spacing the plants upon the lath whereby each plant is left at a point located at the proper distance from the preceding plant; manual means for starting and stopping the machine in operation; automatic means for causing the machine to be thrown out of operation as soon as the last plant has been placed upon the lath; and a special delathing attachment.

My invention comprises further the constructions and combinations hereinafter specifically described and set forth in the claims accompanying this specification.

Figure 9:
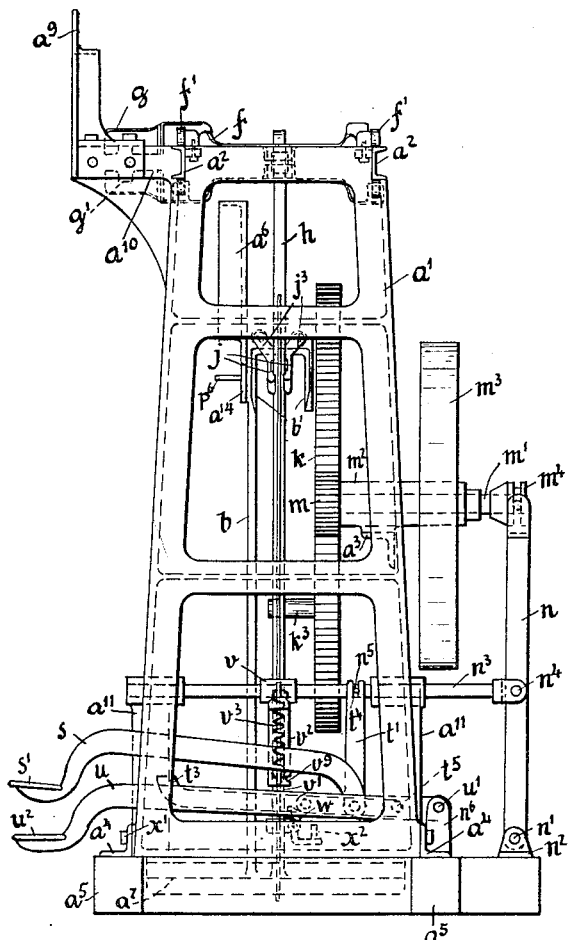
Figure 12:
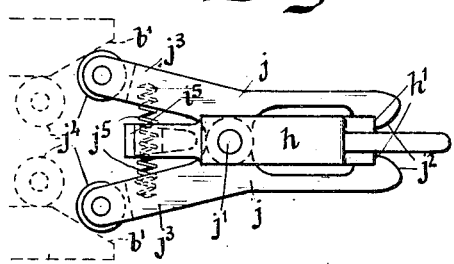
Figures 10, 11:
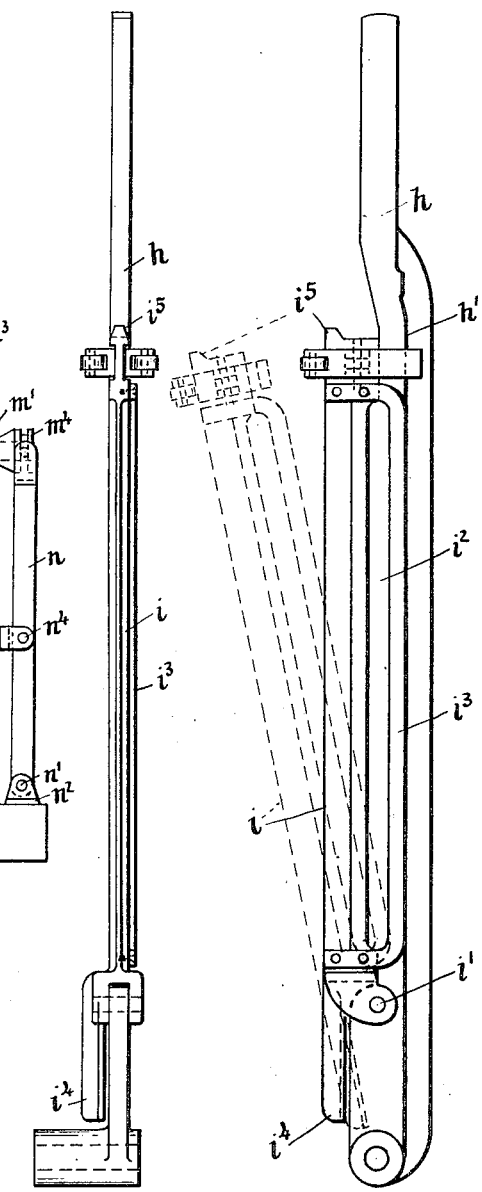
Figure 19:
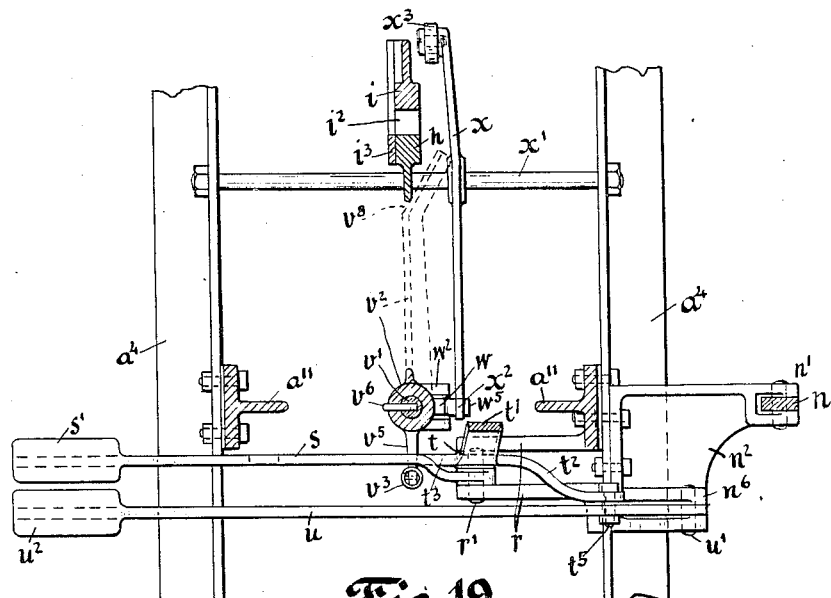
Figure 20:
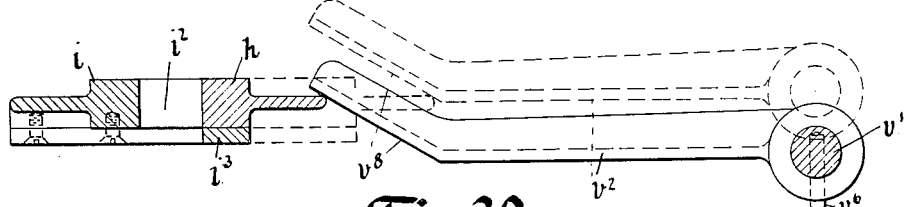
Figure 21:
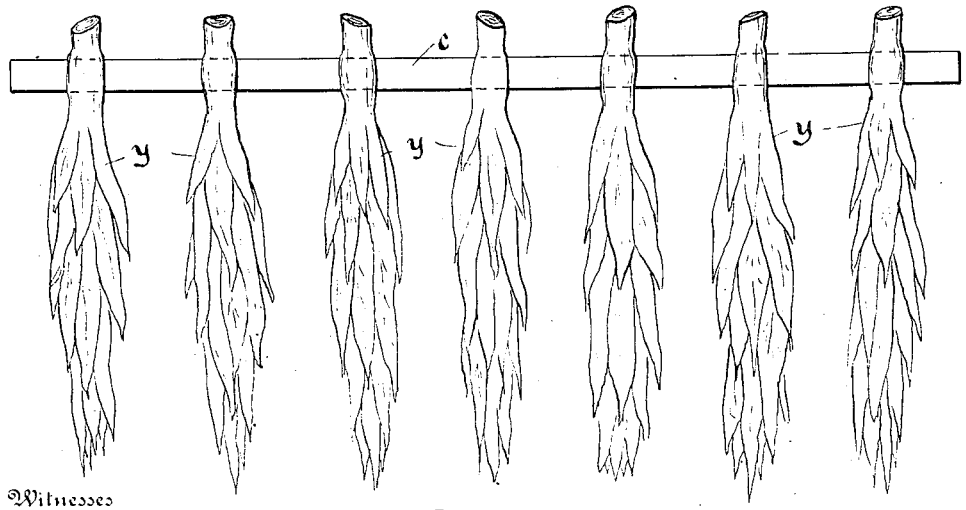
Figure 22:
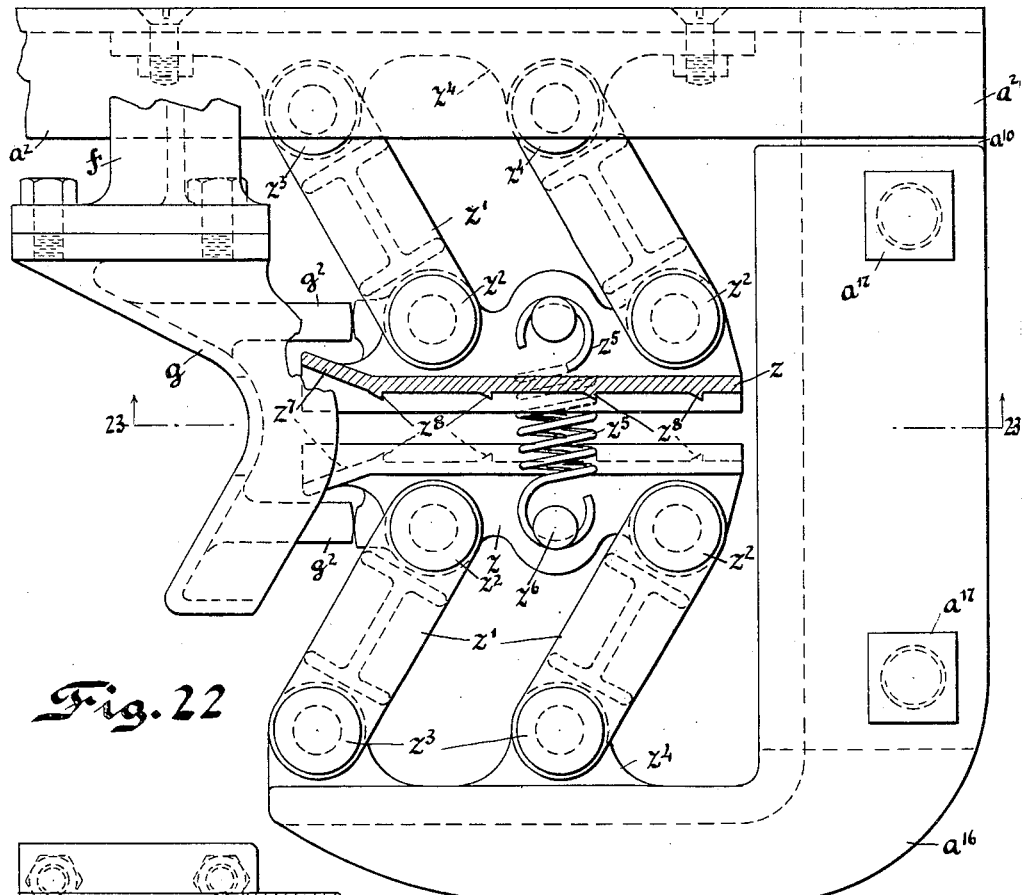
Figure 23:
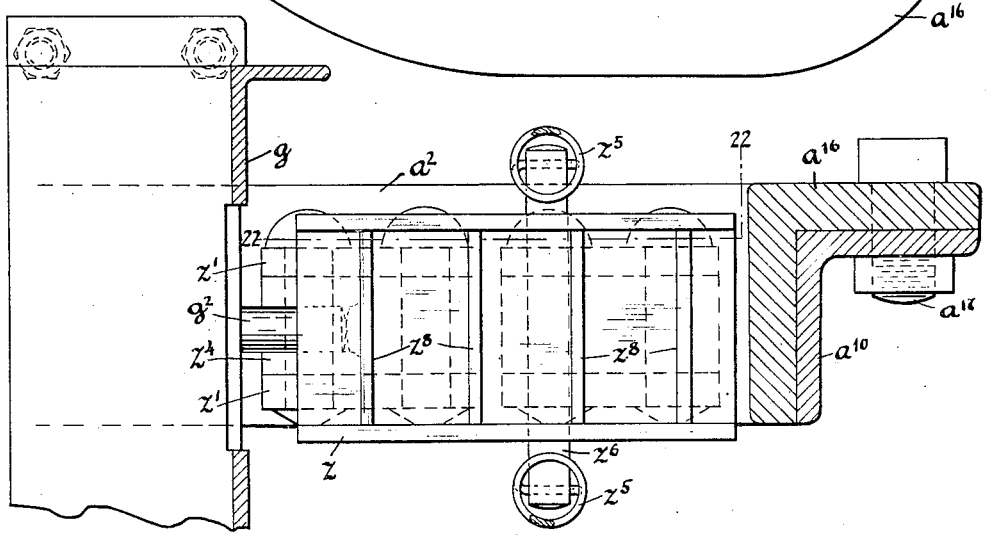

For the better understanding of my invention I have given hereinbelow a concrete description of the most improved form thereof, reference being had to the accompanying drawings, wherein, Figure 1 is a side elevation of the complete machine in normal inoperative position; Fig. 2 is a similar view of the machine in operation showing the conditions existing and the positions of the parts after the placing of the last plant upon the lath and the operation of stopping the machine automatically; Fig. 3 is a plan view of the machine as in Fig. 1, the starting and stopping mechanism being omitted from this figure for clearness sake; Figs. 4 and 5 are respectively a plan and side elevation of the carriage and pusher; Figs. 6 and 7 are respectively a plan and end view of the spear and holding means therefor, the latter showing the lath and one of the frame parts in cross-section; Fig. 8 is a side elevation of the spear with one end of the lath in position therein; Fig. 9 is an end view of the machine from the right of Fig. 1; Figs. 10 and 11 are respectively a side and front view of the pusher-lever and auxiliary arm; Fig. 12 is a plan view of the clutch which secures the pusher-lever to the auxiliary arm, shown in closed position; Fig. 13 is a similar view of said clutch in open position, showing the opening cam-lugs and the pusher-lever in cross section; Fig. 14 is a plan view of the upper end of the spacer-lever, showing the pusher-lever in cross-section and the disconnecting dog on the spacer-bar; Fig. 15 is a longitudinal section through the upper end of the spacer-arm on the plane 15; Fig. 16 is a side elevation of the same; Fig. 17 is a side elevation of the starting and stopping-mechanism, the frame being shown in section on the plane 17 of Fig. 1; Fig. 18 is a vertical cross-section of the same, taken on the plane 18 of Fig. 17; Fig. 19 is a plan-section of the same taken on the horizontal plane 19 of Fig. 18; Fig. 20 is a plan-section of the automatic shifter-arm to show the mode of operation thereof by the pusher-lever, said section being taken on the plane 20 of Fig. 18; Fig. 21 is a side elevation of a lath which has been filled with tobacco plants by the machine. Fig. 22 is a plan of my delathing attachment, partly in section on the plane 22; and Fig. 23 is a longitudinal section thereof on the plane 23.

In these drawings every reference letter and numeral refers always to the same part.

The machine as here constructed comprises a pair of end-frames $a'$ united by longitudinal channels $a^2$ and angle-bars $a^3$, $a^4$ at top, middle, and bottom, and the lower ends of which are provided with skidding-shoes $a^5$ for the purpose of dragging the machine from point to point; but these may be replaced by wheels or other like device or omitted altogether; this being immaterial to the operation of the machine. Longitudinally of the frame and near the upper part thereof is also arranged an angle-bar $a^6$, the middle portion of which is curved to an arc of a circle centered upon the shaft $a^7$ of a rocking-arm $b$; and from the functions they perform I shall term this bar and arm the spacing-bar and spacer respectively. Along the top of the machine and on the front side thereof (being the side on which the operative stands) is placed the removable lath $c$, which is supported at one end in a fixed socket or rest $a^8$, and at the other end in a similar socket or rest $d'$ of the spear $d$, which is shown in detail in Figs. 6, 7 and 8. This spear has at the end opposite from the socket $d'$ a sharply pointed end $d^2$ adapted to transfix the stem of a plant $y$ presented thereto, and supported by two pairs of spring-fingers $e$ which are pivotally mounted on pins $e'$ on the adjacent frame-bar $a^2$ and on a goose-neck arm $a^9$ which is secured to the upper right-hand corner of the frame on a projecting lug or bar $a^{10}$ thereof. The spring-fingers $e$ are normally held pressed into a pair of longitudinal rests or grooves $d^3$ on the face of the spear-head by means of coiled torsion-springs $e^2$ encircling their pivots; and they are spaced at such a distance that, as will be hereinafter seen, a plant pushed over the point of the spear passes the first set of spring-fingers and allows it to come back to its normal position before opening the second set of spring-fingers.

The pusher, which performs the operation of pushing plants $y$ over the spear upon the lath, is in the form of a reciprocating carriage $f$ provided with rollers $f'$ which roll on the upper and lower sides of the channels $a^2$, and with two pairs of other rollers $f^2$ which run on the inner faces of the latter and serve to prevent skewing of the pusher-carriage. On the front end of this carriage is mounted the pusher proper $g$, which consists of a pair of bent fingers adapted to pass over the spring fingers $e$ without touching the latter, and being recessed at $g'$ so as to clear the spear and lath. The pusher is depressed centrally as shown in order to hold any plant which is presented to it directly in line with the point $d^2$ of the spear.

The pusher-carriage is operated by means of the swinging pusher-lever $h$, which is pivoted on the shaft $a^7$ concentric with the spacer-arm $b$; and the upper end of said pusher-lever engages in a yoke $f^4$ on the carriage between antifriction rollers $f^5$. Upon the pusher-lever is mounted an auxiliary arm $i$, being pivoted upon a pin $i'$ near the lower end thereof and detachably connected at the upper end therewith by means of a pair of clutch-jaws $j$, which are pivoted upon pins $j'$ at the upper end of the auxiliary arm $i$ and have hooked ends $j^2$ engaging around shoulders $h'$ on the lever $h$. The jaws $j$ are prolonged rearwardly as shown at $j^3$ and have rollers $j^4$ adapted to be engaged by certain cam-faces $b'$ carried by the spacer-arm as will be hereinafter described; and coiled compression springs $j^5$ are provided between the arm $i$ and prolonged ends $j^3$ for holding the jaws $j$ normally in closed position. In addition, the auxiliary arm $i$ is formed with an elongated slot $i^2$ by means of a U-shaped strap $i^3$ which runs parallel to the body of the arm $i$ and the ends whereof are secured thereto, all as clearly shown in Fig. 11. Furthermore the lower end of the arm $i$ is prolonged below the pivot $i'$ to form a trip-finger $i^4$ for a purpose which will be hereinafter evident.

In the approximate center of the machine is rotatably mounted a gear-wheel $k$ upon a shaft $k'$ turning in suitable bearings $k^2$ supported upon the angle-bars $a^3$. This gear carries a laterally projecting pin $k^3$, which runs in the slot $i^2$ of the auxiliary arm $i$ and thereby as it rotates carries the arm $i$ with it, and also the pusher-lever $h$ in those parts of its movement during which the clutch-jaws $j$ are engaged with the pusher-lever. The movement conveyed to the pusher-lever and pusher by this connection with the wheel $k$ is what is known as a quick-return movement; that is to say, the wheel revolving uniformly in the direction of the arrow, the advance-movement of the pusher upon the lath $c$ is slower than the return-movement to its original position This rapid return-movement plays some part in the mechanical operation of the apparatus as well as enabling faster operation, as will be seen hereafter.

With the wheel $k$ meshes the driving-pinion $m$, which is mounted on the main or operating-shaft $m'$, which turns in a bearing $m^2$, also mounted on the angle-bar $a^2$, said shaft $m'$ having loosely mounted thereon the driving-pulley $m^3$ and a clutch-cone $m^4$, which, by a longitudinal movement upon the shaft, causes the pulley $m^3$ to be operatively connected therewith or the reverse, in the usual manner of clutches. A clutch-finger $m^5$ is shown by way of conventional illustration, but I wish it understood that any appropriate form of clutch may be used, this not forming a part of my invention. The clutch-cone $m^4$ is operated by a forked-shifter-arm $n$, which is pivoted at $n'$ on a bracket-arm $n^2$, as best shown in Fig. 17. This shifter-arm is operated through the medium of a longitudinally sliding bar $n^3$, pivotally connected at $n^4$ with the arm $n$ and slidably supported in a pair of standards $a^{11}$ secured to the lower frame-bars $a^4$. The automatic shifting-mechanism provided in connection with the bar $n^3$ will be described later on.

The swinging or oscillating movement transmitted by the wheel $k$ to the pusher-lever would normally be continuous and would at each complete revolution of the wheel move the pusher from its normal position at the right to its extreme left-hand position in which it places a plant on the left hand end of the lath; but by means of the spacing-mechanism which will now be described, the clutch-jaws $j$ carried by the auxiliary arm $i$ are caused at certain predetermined points of the movement to release the pusher-arm whereby the latter is brought to a standstill at those points, while the auxiliary arm $i$ continues its movement forward and back until it reaches the pusher-lever again on its return movement, when the clutch-jaws $j$ are caused to grip the latter again and both together are returned to the starting-point. The mechanism which accomplishes this consists of a pair of cam-faces $b'$, which are carried on the upper end of the spacer-arm, and lie in the line of movement of the cam-rollers $j^4$, as shown more particularly in Fig. 13 of the drawings; whereby as soon as the cam-rollers $j^4$ strike the cam-faces $b'$ on the forward movement of the pusher and auxiliary arm, the jaws $j$ will be opened and the pusher-arm released. Coöperating with the cam-faces $b'$ is a pivoted pawl $o$ mounted on the spacer-arm above the cam-faces $b'$ (see Figs. 14 and 16) upon a pin $o'$ and having shoulders $o^2$, $o^3$, which are at the proper distance for gripping the opposite side-edges of the pusher-lever when the latter is brought opposite, as shown in Fig. 14. The pawl $o$ has further a heel $o^4$ projecting forward into position to be actuated by one of a number of dogs $o^5$ on the spacer-bar, for the purpose to be described later; a lug $o^6$ limiting its forward movement; and a spring $o^7$ pressing thereagainst to hold the pawl normally in its forward position. The front end of the pawl is cut off obliquely at $o^8$, whereby the pusher-lever as it advances moves the pawl to one side, and is received between the shoulders $o^2$, $o^3$ thereof just as it is released by the opening of the jaws $j$. By this mechanism it will be seen, therefore, that as soon as the pusher-lever strikes the spacer-arm the auxiliary arm $i$ is detached therefrom and continues its movement, while the pusher-lever is held by the pawl $o$.

The spacer-arm has further on its upper end means for engaging the spacer-bar $a^6$ at intervals corresponding to equal intervals upon the lath $c$. Said means comprise a sliding-pawl $p$ provided with teeth $p'$ at its upper end adapted to engage in corresponding teeth $a^{12}$ formed on the edge of the bar $a^6$. The pawl $p$ is mounted on cap-screws $p^2$ passing through longitudinal slots $p^3$, and is recessed at $p^4$ on its under side to receive a coiled tension-spring $p^5$, one end of which is secured to the upper cap-screw $p^2$ while the other end passes through a hole in a pin $p^6$ projecting out at the front of the pawl for a purpose which will be presently seen. The pawl $p$ is held normally in engagement with the teeth $a^{12}$ by the spring $p^5$, and is operated to be released therefrom whenever the spacer-arm is to be moved forward one space by means of a rock-arm $q$ having a nose $q'$ engaging in a recess $p^7$ in one side of the pawl $p$, said rock-arm being pivoted on a pin $q^2$ on the side of the spacer-arm. On the opposite end of the rock-arm $q$ is mounted a shaft $q^3$, whose other end is supported by a rock-arm $q^4$ rotatably mounted on a cap-screw $q^5$ on the opposite side of the spacer-arm; and on the middle of said shaft $q^3$ is mounted a trip-pawl $q^6$, which has a pin-and-slot connection $q^7$ (shown in dotted lines in Fig. 14) with the shaft such as to give it a limited angle of movement thereon. The right-hand limiting position of the pawl $q^6$ is vertical, in which it is resiliently maintained by a spring $q^8$, and from which it may swing to the left sufficiently far to clear a projecting lug $i^5$ on the upper end of the auxiliary arm $i$. On its advance-movement the auxiliary arm $i$ will therefore clear the pawl $q^6$ which swings loosely to the left, but on its return-movement said pawl will be tripped by the lug $i^5$ and will be forced upward so as to oscillate the rock-arm $q$ and withdraw the pawl $p$ from engagement with the serrations $a^{12}$, so that the spacer-arm will be free to move to the right. At the same time the auxiliary arm strikes the pusher-lever, and this, being now engaged with the pawl $o$, moves to the right carrying the spacer-arm with it. This movement continues until the spacer-arm arrives at the next space, at which point the heel $o^4$ of the pawl $o$ is struck and tripped by one of the dogs $o^5$, which are of just sufficient height to cause the pawl to open sufficiently to release the pusher-lever, while at the same time the momentum of the spacer-arm is sufficient to carry the heel $o^4$ over the point of the dog. As the pawl $o$ releases the pusher-lever, the spacer-arm will lose its engagement therewith and come to a stop, the lug $i^5$ at the same time clearing the pawl $q^6$ and releasing the pawl $p$, which by the tension of the spring $p^5$ is forced into engagement with the teeth $a^{12}$ immediately above it, and thus is held in its advanced position. Thus it will be seen that at each revolution of the wheel $k$ the spacer-arm is caused to advance to the right one space, and therefore at each cycle the pusher-lever $h$ is released one space earlier in its movement and therefore leaves the plant upon the lath at one space to the right of the plant previously speared. This will continue until the last space is reached; and just at the right of this space on the spacer-arm $a^6$ is mounted a cam-dog $a^{13}$ whose active face $a^{14}$ lies in the path of the projecting pin $p^6$ and is oblique to the movement of the latter; so that as the spacer-arm advances beyond the last space the surface $a^{14}$ engages the projecting pin $p^6$ and draws down the pawl $p$ until a notch $p^8$ in the left-hand side thereof comes opposite the nose $p^9$ of a pawl $p^{10}$, which is pivoted upon a pin $p^{11}$ on the spacer-arm and has an overweighting arm $p^{12}$ causing the nose $p^9$ to enter and engage with the notch $p^8$ as soon as the latter is brought opposite thereto in the manner aforesaid. It will be understood that this movement of the pawl $p$ carries it below the position to which it is moved by the operation of the pawl $q^6$, so that the pawl $p^{10}$ does not become engaged with it at any time except by means of the cam-dog $a^{13}$. To the spacer-arm is connected a spring $b^2$ tending to draw the arm to the left, so that when the pawl $p$ is pressed down by the cam-dog $a^{13}$ (the pusher-lever $h$ being at the same time disengaged from the pawl $o$ by the last dog $o^5$) the spacer-arm moves back to its left-hand limiting position, that is to say to the first space; and at this point the end of the arm $p^{12}$ of the pawl $p^{10}$ is struck by a dog $a^{15}$ on the spacer-arm, which throws it out of engagement with the pawl $p$ and the latter is therefore free to engage the teeth $a^{12}$ once more.

As thus far described the machine is sufficiently complete, assuming that the filled lath can be removed and replaced by an empty one during the return movement of the last cycle, and that no extra time is necessary for this purpose; but as ordinarily it will be preferable to run the machine at such a speed as would not give sufficient time between the placing of the last plant on one lath and the first plan on the next for the changing of the lath, I provide an automatic stop-device which throws the machine out of operation as soon as the last plant is placed on the lath. This and the connected devices are shown more particularly in Figs. 17 to 20 inclusive. On a bracket-arm $r$, secured to the lower rear angle-bar $a^4$ of the frame, or otherwise, is carried a pin $r'$ which serves as a pivot for the foot-lever $s$, which is the starting-lever for the machine and extends to the front of the machine and carries a pedal $s'$. On the pin $r'$ is also provided a T-lever $t$ having an upright arm $t'$ and two horizontal arms $t^2$, $t^3$ extending forward and back respectively. The extremity of the upright arm $t'$ is slotted at $t^4$ to engage with a pin $n^5$ on the bar $n^3$, and the rearwardly extending arm $t^2$ is connected by a pin $t^5$ to a second foot-lever $u$ pivoted upon a pin $u'$ carried by an ear $n^6$ on the bracket $n^2$. The foot-lever $u$, which I shall term the emergency-stop lever, extends to the front of the machine and has a pedal $u^2$ side by side with the pedal $s'$; and said lever acts as a weight upon the T-lever $t$ to hold the upright arm $t'$ normally in its right-hand position, or in other words with the clutch-cone $m^4$ out of action. The end of the forwardly extending arm $t^3$ of the lever $t$ lies directly under the lever $s$ in position to be depressed by the latter, so that when said lever $s$ is depressed by the foot of the operator, the lever $t$ is rocked forward and the machine started up.

Mounted on the bar $n^3$ is a crosshead $v$ which carries a vertically depending rod $v'$, on which is slidably mounted the automatic shifting-arm $v^2$; and a coiled tension-spring $v^3$, connected at opposite ends to lugs $v^4$ and $v^5$ on the crosshead and arm respectively holds the latter normally sustained in its uppermost position. The lug $v^5$ takes under the lever $s$ so that the arm $v^2$ can be depressed by the latter. The hub of the arm $v^2$ is nonrotatably connected with the rod $v'$ by means of a pin $v^6$ projecting laterally from the rod and running in a slot $v^7$ in the hub of the arm; or any other suitable means for preventing relative rotation may be employed. The arm $v^2$ extends forward into the path of the pusher-lever as shown in Fig. 1, and has an oblique cam-face $v^8$ which is adapted to be struck by the latter as it returns to its starting position, whereby the arm $v^2$ is pushed bodily to the rear, as shown in Fig. 20, carrying the bar $n^3$ and shifting-arm $n$ with it and thus throwing the machine automatically out of action. Normally, however, this does not occur, because the arm $v^2$ is kept depressed out of the way of the lever $h$ by means of a spring-pawl $w$ pivoted upon a pin $w'$ carried by a collar $w^2$ on the lower end of the bar $v'$, the nose $w^3$ of said pawl engaging in a notch $v^9$ on the lower end of the hub of the arm $v^2$ as soon as the latter is sufficiently depressed; and a coiled compression-spring $w^4$ holds the pawl $w$ in such engagement until released therefrom by the action of a two-armed lever $x$, which is pivoted upon a shaft $x'$ extending across the frame. The right-hand arm of the lever $x$ has a toe $x^2$ adapted to strike and depress the heel $w^5$ of the pawl $w$, and to oscillate the latter until the nose $w^3$ is released from the notch $v^6$; and the left-hand arm of the lever $x$ carries a roller $x^3$ which lies in the path of movement of the trip-finger $i^4$ in the last position of the spacer $b$, but at no other time. The design is such that when the spacer is in any other than the last space, the swinging movement of the auxiliary arm $i$ does not bring it sufficiently far to contact with and oscillate the lever $x$; but in the last space it does perform this action, in the manner illustrated in Fig. 2. When therefore the lever $s$ is depressed it carries down with it the arm $v^2$ until the latter is engaged and held by the pawl $w$; and the automatic shifting-arm is therefore out of the way of the pusher-lever until the last space is reached, at which time in the manner aforesaid the pawl $w$ is tripped and the shifting-arm $v^2$ brought back to its operative position in time for being acted upon by the pusher-lever just as the latter returns to its starting point. Hence a depression of the lever $s'$ acts to start up the machine and the latter is automatically thrown out of operation as soon as the lath is filled. Should it be desired to stop the machine at any other time, the lever $u$ is depressed, which oscillates the lever $t$ independently, raising also the lever $s$ ready for starting again.

In Figs. 22 and 23 I have shown an attachment whereby the spearing-machine may be converted into a delathing-machine and used to strip the plants from the laths. For this purpose the goose-neck arm $a^9$ and supporting-fingers $e$, as well as the spear $d$, are removed and in place thereof a bracket $a^{16}$ is secured to the lug or extension $a^{10}$, conveniently by means of bolts $a^{17}$. On the frame-bar $a^2$ and the end of the bracket $a^{16}$ parallel thereto are mounted two sets of clutch-jaws $z$, each of which is pivotally mounted on a pair of pivotal links $z'$, by means of pivot-pins $z^2$, said links being further pivoted on pins $z^3$ mounted in bases $z^4$, one of which is removably secured to the frame-bar $a^2$ and the other formed on the bracket $a^{16}$. As will be seen, the length of the links $z'$ is such that the clutch-jaws $z$ come together before the links reach a perpendicular position, so that said links taken in conjunction with a pair of coiled springs $z^5$ connecting a pair of pins $z^6$ on the respective clutch-jaws, constitute toggle-links when used in connection with the lath $c$ in the manner to be described. When it is desired to strip a lath, the end of the lath is inserted between the jaws $z$, the forward end of which is made flared as shown at $z^7$ to facilitate the entrance of the lath; and the internal faces of the clutch-jaws are provided with projecting teeth or rugosities $z^8$ which are pressed into the lath by the springs $z^5$; so that when once inserted, the lath cannot be withdrawn by a pull thereon, since the toggle-links $z'$ press the jaws more firmly together; and the pusher being brought into action, moves forward stripping all of the plants from and carrying them off the end of the lath, it being remembered that the lath is in a position forward of that used for placing the plants thereon, so that the travel of the pusher on the first stroke of the complete cycle carries it over the end. In order to cause the pusher to make a complete swing at each revolution during the delathing operation, the pawl $o$ may be blocked back so that it does not engage therewith.

In order to permit of the lath being easily inserted and removed from the jaws $z$, I further provide projecting lugs $g^2$ on the pusher which are adapted to strike endwise a coöperating pair of lugs $z^9$ just as the pusher reaches its starting-point, and thus move said jaws endwise and thereby open them to release the lath and may be held thereby. When this device is used, it is of course necessary to support the lath after inserting it between the jaws until the pusher has moved forward sufficiently to disengage the jaws and allow them to come back to the clutching position.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the reasonable scope of my claims.

Having thus described my invention, what I claim as new and desire to secure by Letters Patent is:

1. A machine of the class described comprising, in conjunction with a member on which a plurality of plants are adapted to be impaled, a reciprocating device adapted to impale plants on said member, and means for causing said reciprocating member to drop each successive plant at a different point on said member whereby the plants are spaced apart thereon.

2. A machine of the class described comprising, in conjunction with a member on which a plurality of plants are adapted to be impaled, a reciprocating device adapted to impale plants on said member, and means for causing said device to move each successive plant a less distance along said member than the preceding plant.

3. A machine of the class described comprising, in conjunction with a member on which a plurality of plants are adapted to be impaled, a reciprocating device adapted to impale plants on said member, means for causing said device to move each successive plant a less distance along said member than the preceding plant, and means for automatically stopping said device as soon as a predetermined quota of plants has been placed upon said member.

4. A machine of the class described comprising a member having a point at one end thereof on which plants are adapted to be impaled, a reciprocating device adapted to impale plants on said member, means for supporting said member in the line of travel of said reciprocating device, and means for reciprocating said device over successively shorter distances of travel at each cycle of movement.

5. A machine of the class described comprising a member having a point at one end thereof on which plants are adapted to be impaled, a reciprocating device adapted to impale plants on said member, means for supporting said member in the line of travel of said reciprocating device, and means adapted to reciprocate said device over a definite distance of travel along said member in the first cycle, a shorter distance along said member in the second cycle, a still shorter distance in the third cycle and so on to successively shorter distances until the last plant of a predetermined quota has been placed upon said member.

6. A machine of the class described comprising a member having a point at one end thereof on which plants are adapted to be impaled, a reciprocating device adapted to impale plants on said member, means for supporting said member in the line of travel of said reciprocating device, means adapted to reciprocate said device over a definite distance of travel along said member in the first cycle, a shorter distance along said member in the second cycle, a still shorter distance in the third cycle and so on to successively shorter distances until the last plant of a predetermined quota has been placed upon said member, and means for automatically stopping said reciprocating device after said last mentioned cycle of movement thereof.

7. A machine of the class described, in conjunction with a lath and a point at one end thereof, means for supporting said lath, a reciprocating pusher moving over a path in line with said lath and partially surrounding the same, said pusher having a movement beyond the pointed end of said lath at one end, said pusher being adapted to impale plants upon said lath over the pointed end thereof, and means for causing said pusher to leave each successive plant at a predetermined distance from the preceding plant.

8. In a machine of the class described, in conjunction with a lath and a point at one end thereof, means for supporting said lath, a reciprocating pusher moving over a path in line with said lath and partially surrounding same, said pusher having a movement beyond the pointed end of said lath at one end, said pusher adapted to impale plants upon said lath over the pointed end thereof, means for causing said pusher to leave each successive plant at a predetermined distance from the preceding plant, means for continuous reciprocating said pusher, and means for automatically stopping the movement of said pusher when the last plant has been placed upon said lath.

9. In a machine of the class described, the combination of a swinging spacer-arm, a bar lying adjacent to said arm, means on said arm for engaging said bar at predetermined intervals thereof, a reciprocating pusher, means for reciprocating said pusher, and devices acting between said pusher and spacer-arm whereby the travel of said pusher in one direction is limited in accordance with the position of said spacer-arm.

10. In a machine of the class described, in conjunction with a member on which plants are to be impaled, a spacer-bar adjacent to said member for regulating the distance of the plants from one another when impaled on said member, a spacing-device adapted to move along said spacer-bar and having means for engaging it therewith at predetermined intervals thereof, and a reciprocating pusher adapted to impale a plant on said member and move it to a point thereon corresponding with the position of said spacer.

11. In a machine of the class described, in conjunction with a member on which plants are to be impaled, a spacer-bar adjacent to said member for regulating the distance of the plants from one another when impaled on said member, a spacing-device adapted to move along said spacer-bar and having means for engaging it therewith at predetermined intervals thereof, a reciprocating pusher adapted to impale a plant on said member and move it to a point thereon corresponding with the position of said spacer, and means for limiting the travel of said pusher on any advance movement thereof to a point corresponding with the position of said spacer.

12. In a machine of the class described, in conjunction with a member on which plants are to be impaled, a spacer-bar adjacent to said member for regulating the distance of the plants from one another when impaled on said member, a spacing-device adapted to move along said spacer-bar and having means for engaging it therewith at predetermined intervals thereof, a reciprocating pusher adapted to impale a plant on said member and move it to a point thereon corresponding with the position of said spacer, means for limiting the travel of said pusher on any advance movement thereof to a point corresponding with the position of said spacer, and means for causing said spacer to advance one space on each cycle of movement of said pusher.

13. In a machine of the class described, in combination with a member on which plants are to be impaled, a spacer-bar adjacent to said member for regulating the distance of the plants from one another when impaled on said member, a spacing-device adapted to move along said spacer-bar and having means for engaging it therewith at predetermined intervals thereof, a reciprocating pusher adapted to impale a plant on said member and move it to a point thereon corresponding with the position of said spacer, means for limiting the travel of said pusher on any advance movement thereof to a point corresponding with the position of said spacer, and clutch devices adapted to engage said pusher with said spacer at the limiting point of its movement and to carry said spacer with it on the return movement through one space; whereby said spacer moves step by step with each successive cycle and the travel of said pusher becomes successively shorter on each cycle.

14. In a machine of the class described, in conjunction with a member on which plants are to be impaled, a spacer-bar adjacent to said member for regulating the distance of the plants from one another when impaled on said member, a spacing-device adapted to move along said spacer-bar and having means for engaging it therewith at predetermined intervals thereof, a reciprocating pusher adapted to impale a plant on said member and move it to a point thereon corresponding with the position of said spacer, means for limiting the travel of said pusher on any advance movement thereof to a point corresponding with the position of said spacer, clutch-devices adapted to engage said pusher with said spacer at the limiting point of its movement and to carry said spacer with it on the return movement through one space, whereby said spacer moves step by step with each successive cycle and the travel of said pusher becomes successively shorter on each cycle, means for continuously reciprocating said pusher, and an automatic trip-device connected therewith for stopping said pusher on the completion of its last cycle.

15. In a machine of the class described, the combination of a pusher adapted to reciprocate over a given path of travel, a swinging pusher-lever connected with said pusher, means for swinging said pusher-lever back and forth, a spacer-bar mounted adjacent to the path of travel of said pusher, a spacer having a path of movement along said spacer-bar, means for causing said spacer to grip said spacer-bar at predetermined intervals thereof, means for disconnecting said pusher-lever from said swinging means, and trip-devices carried by said spacer adapted to act upon said disconnecting-means whereby said pusher-lever is brought to a stop at different points of its travel depending on the position of said spacer.

16. In a machine of the class described, the combination of a pusher adapted to reciprocate over a given path of travel, a swinging pusher-lever connected with said pusher, means for swinging said pusher-lever back and forth, a spacer-bar mounted adjacent to the path of travel of said pusher, a spacer having a path of movement along said spacer-bar, means for causing said spacer to grip said spacer-bar at predetermined intervals thereof, means for disconnecting said pusher-lever from said swinging means, trip-devices carried by said spacer adapted to act upon said disconnecting-means whereby said pusher-lever is brought to a stop at different points of its travel depending on the position of said spacer, means on said pusher for engaging said spacer whereby it is moved along said spacer-bar by the pusher, and a trip-device acting to disconnect said spacer from said pusher after the latter has moved it through one of said intervals on the spacer-bar.

17. In a machine of the class described, the combination of a pivoted spacer-arm having a movement through a certain angle, a spacer-bar curved to an arc of a circle concentric with the pivot of said arm, means on said spacer-arm for gripping said spacer-bar, a reciprocating pusher, a pusher-lever pivoted on an axis concentric with said spacer-arm and actuating said pusher, means for reciprocating said pusher-lever disconnectibly engaging therewith, a device on said spacer-arm adapted to stop and hold said pusher-lever as it comes opposite thereto and simultaneously release it from engagement with its reciprocating means, and means on said spacer-bar for causing said device to release engagement with said pusher-lever after the latter has moved said spacer-arm a predetermined interval on its return movement.

18. In a machine of the class described, the combination of a spacer-arm and a pusher-lever both pivoted on the same axis, a spacer-bar curved to an arc having its center at said axis, means on said spacer-arm for causing it to grip said spacer-bar at certain predetermined intervals thereof, an auxiliary arm pivoted to said pusher-lever, means for reciprocating said auxiliary arm, a gripping-device holding said auxiliary arm in engagement with said pusher-lever, means carried by said spacer-arm for causing said gripping-device to disengage said auxiliary arm from said pusher-lever when the latter comes opposite to the spacer-arm on its forward movement, whereby said auxiliary arm continues the advance-movement and returns to said pusher-lever carrying it back with it on the return-stroke, and means for advancing said spacer-arm space by space with each cycle of the machine.

19. In a machine of the class described, the combination of a spacer-arm and a pusher-lever both pivoted on the same axis, a spacer-bar curved to an arc having its center at said axis, means on said spacer-arm for causing it to grip said spacer-bar at certain predetermined intervals thereof, an auxiliary arm pivoted to said pusher-lever, means for reciprocating said auxiliary arm, a gripping-device holding said auxiliary arm in engagement with said pusher-lever, means carried by said spacer-arm for causing said gripping-device to disengage said auxiliary arm from said pusher-lever when the latter comes opposite to the spacer-arm on its forward movement, whereby said auxiliary arm continues the advance-movement and returns to said pusher-lever carrying it back with it on the return-stroke, means carried by said auxiliary arm adapted to release said spacer-arm from said spacer-bar as it comes opposite to it on the return-movement, whereby a continuation of the return-movement of said auxiliary arm beyond said point carries with it the pusher-lever and spacer-arm, and means on said spacer-bar for disengaging said spacer-arm from said pusher-lever after it has been moved through a predetermined interval, said release also causing said auxiliary arm to release said gripping means whereby at the moment of its release said spacer-arm is caused to grip the spacer-bar in this advanced position.

20. In a machine of the class described, the combination of a spacer-arm and a pusher-lever both pivoted on the same axis, a spacer-bar curved to an arc having its center at said axis, means on said spacer-arm for causing it to grip said spacer-bar at certain predetermined intervals thereof, an auxiliary arm pivoted to said pusher-lever, means for reciprocating said auxiliary arm, a gripping-device holding said auxiliary arm in engagement with said pusher-lever, means carried by said spacer-arm for causing said gripping-device to disengage said auxiliary arm from said pusher-lever when the latter comes opposite to the spacer-arm on its forward movement, whereby said auxiliary arm continues the advance movement and returns to said pusher-lever carrying it back with it on the return stroke, and means for advancing said spacer-arm space by space with each cycle of the machine, means on said spacer-bar for causing release of said gripping-means from said spacer-bar, a device on said spacer-arm for holding the gripping-means in released position when so released, means acting to move said spacer-arm back to its original or first position, and a device on said spacer-bar in position to strike said last-named device on said spacer-arm as it reaches said position and cause said device to release said gripping-means whereby the latter again engages with said spacer-bar in the first position of the spacer-arm.

21. In a machine of the class described, the combination of a spacer-arm and a pusher-lever both pivoted on the same axis, a spacer-bar curved to an arc having its center at said axis, means on said spacer-arm for causing it to grip said spacer-bar at certain predetermined intervals thereof, an auxiliary arm pivoted to said pusher-lever, means for reciprocating said auxiliary arm, a gripping-device holding said auxiliary arm in engagement with said pusher-lever, means carried by said spacer-arm for causing said gripping-device to disengage said auxiliary arm from said pusher-lever when the latter comes opposite to the spacer-arm on its forward movement, whereby said auxiliary arm continues the advance movement and returns to said pusher-lever carrying it back with it on the return stroke, means carried by said auxiliary arm adapted to release said spacer-arm from said spacer-bar as it comes opposite to it on the return movement, whereby a continuation of the return movement of said auxiliary arm beyond said point carries with it the pusher-lever and spacer-arm, means on said spacer-bar for disengaging said spacer-arm from said pusher-lever after it has been moved through a predetermined interval, said release also causing said auxiliary arm to release said gripping means whereby at the moment of its release said spacer-arm is caused to grip the spacer-bar in this advanced position, an operative connection with a source of power for continuously driving the machine, a shiftable device adapted to connect and disconnect said source of power from said machine, and devices adapted to be operated by said pusher-arm on its last cycle of movement, to disconnect said source of power on the completion of said last cycle.

22. In a machine of the class described, the combination of a spacer-arm and pusher-lever both pivoted on the same axis, a spacer-bar curved to an arc having its center at said axis, means on said spacer-arm for causing it to grip said spacer-bar at certain predetermined intervals thereof, an auxiliary arm pivoted to said pusher-lever, means for reciprocating said auxiliary arm, a gripping-device holding said auxiliary arm in engagement with said pusher-lever, means carried by said spacer-arm for causing said gripping-devices to disengage said auxiliary arm from said pusher-lever when the latter comes opposite to the spacer-arm on its forward movement, whereby said auxiliary arm continues the advance movement and returns to said pusher-lever carrying it back with it on the return stroke, means carried by said auxiliary arm adapted to release said spacer-arm from said spacer-bar as it comes opposite to it on the return-movement, whereby a continuation of the return-movement of said auxiliary arm beyond said point carries with it the pusher-lever and spacer-arm, means on said spacer-bar for disengaging said spacer-arm from said pusher-lever after it has been moved through a predetermined interval, said release also causing said auxiliary arm to release said gripping means whereby at the moment of its release said spacer-arm is caused to grip the spacer-bar in this advanced position, an operative connection with a source of power for continuously driving the machine, a shiftable device adapted to connect and disconnect said source of power from said machine, a shifting-device normally in the path of the pusher-lever in its starting and finishing position and adapted to be shifted thereby in returning to its position to disconnect said source of power, means for holding said shifting-device out of its position in the path of said pusher-lever, and means operated by said auxiliary arm on its last swing only for returning said shifting-device to its normal position.

23. A machine of the class described comprising, in combination, a reciprocating pusher traveling on ways, a pivoted pusher-lever operatively engaged with said pusher, a slotted auxiliary arm pivotally mounted on said pusher-lever, a gripping-device for causing the free end of said auxiliary arm to grip said pusher-lever, a wheel having a projecting pin traveling in the slot of said auxiliary arm, a spacer-bar, and a spacing-device traveling along said bar and carrying means for causing said gripping-device to release said auxiliary arm from said pusher-lever when the latter comes opposite thereto, whereby said auxiliary arm continues the advance and return-movement independently of said pusher-lever, said gripping device acting to grip said pusher-lever again as it reaches it on the return-movement.

24. A machine of the class described comprising, in combination, a reciprocating pusher traveling on ways, a pivoted pusher-lever operatively engaged with said pusher, a slotted auxiliary arm pivotally mounted on said pusher-lever, a gripping-device for causing the free end of said auxiliary arm to grip said pusher-lever, a wheel having a projecting pin traveling in the slot of said auxiliary arm, a spacer-bar, a spacing-device traveling along said bar and carrying means for causing said gripping-device to release said auxiliary arm from said pusher-lever when the latter comes opposite thereto, whereby said auxiliary arm continues the advance and return-movement independently of said pusher-lever, said gripping-device acting to grip said pusher-lever again as it reaches it on the return-movement, means for interengaging said spacing-device with said pusher-lever as the latter comes opposite thereto whereby said pusher-lever carries said spacing-device with it on its return-movement, and a device on said spacer-bar adapted to disconnect said interengaging means to release said pusher-lever from the spacing-device when the latter has traveled over one space corresponding to the distance between two plants.

25. A machine of the class described comprising, in combination, a reciprocating pusher traveling on ways, a pivoted pusher-lever operatively engaged with said pusher, a slotted auxiliary arm pivotally mounted on said pusher-lever, a gripping-device for causing the free end of said auxiliary arm to grip said pusher-lever, a wheel having a projecting pin traveling in the slot of said auxiliary arm, a spacer-bar, a spacing-device traveling along said bar and carrying means for uncoupling said gripping-device to release said auxiliary arm from said pusher-lever when the latter comes opposite thereto, whereby said auxiliary arm continues the advance and return-movement independently of said pusher-lever, said gripping-device acting to grip said pusher-lever again as it reaches it on the return-movement, means for interengaging said spacing-device with said pusher-lever as the latter comes opposite thereto whereby said pusher-lever carries said spacing-device with it on its return-movement, a device on said spacer-bar adapted to disconnect said interengaging means to release said pusher-lever from the spacing-device when the latter has traveled over one space corresponding to the distance between two plants, a gripping-pawl normally engaged in teeth or notches on said bar to hold said spacing-device in fixed relation thereto, a tripping-pawl adapted to retract said gripping-pawl from said spacer-bar, and a tripping-device on said auxiliary arm adapted to pass said tripping-pawl inoperatively on the advance-movement but to operate it to retract said gripping-pawl on the return-movement whereby said spacing-device is temporarily released from engagement with said spacer-bar, said tripping-device releasing said tripping-pawl at the moment said interengaging means disconnects said spacing-device from said pusher-lever whereby at the same moment said gripping-pawl engages the spacer-bar in the new position of the spacing-device.

26. A machine of the class described comprising, in combination, a reciprocating pusher traveling on ways, a pivoted pusher-lever operatively engaged with said pusher, a slotted auxiliary arm pivotally mounted on said pusher-lever, a gripping-device for causing the free end of said auxiliary arm to grip said pusher-lever, a wheel having a projecting pin traveling in the slot of said auxiliary arm, a spacer-bar, a spacing-device traveling along said bar and carrying means for uncoupling said gripping-device to release said auxiliary arm from said pusher-lever when the latter comes opposite thereto, whereby said auxiliary arm continues the advance and return-movement independently of said pusher-lever, said gripping-device acting to grip said pusher-lever again as it reaches it on the return-movement, means for interengaging said spacing-device with said pusher-lever as the latter comes opposite thereto whereby said pusher-lever carries said spacing-device with it on its return movement, a device on said spacer-bar adapted to disconnect said interengaging means to release said pusher-lever from the spacing-device when the latter has traveled over one space corresponding to the distance between two plants, a gripping-pawl normally engaged in teeth or notches on said bar to hold said spacing-device in fixed relation thereto, a tripping-pawl adapted to retract said gripping-pawl from said spacer-bar, and a tripping-device on said auxiliary arm adapted to pass said tripping-pawl inoperatively on the advance-movement but to operate it to retract said gripping-pawl on the return-movement whereby said spacing-device is temporarily released from engagement with said spacer-bar, said gripping-device releasing said tripping-pawl at the moment said interengaging-means disconnects said spacing-device from said pusher-lever whereby at the same moment said gripping-pawl engages the spacer-bar in the new position of the spacing-device; in conjunction with a laterally projecting element on said gripping-pawl, a third pawl mounted on said spacing-device and adapted to engage and hold said gripping-pawl in retracted position when moved beyond the retracted position to which it is moved by said tripping-device on the auxiliary lever, an oblique cam-face at the further limit of movement of said spacing-device adapted by striking said projecting element on said gripping-pawl to retract the latter sufficiently to enable it to be engaged and held in said retracted position by said third pawl, means acting to return said spacing-device to its first position when released, and a projecting element adapted to engage a coöperating element on said third pawl on the return-movement of the spacing-device and move said third pawl out of engagement with said gripping-pawl whereby said gripping-pawl releases and again engages said spacer-bar in the first position of said spacing device.

27. In a machine of the class described, the combination of a source of power, a rotating wheel, a shiftable driving-connection between said wheel and source of power by the shifting of which said wheel is started and stopped, a shifter-bar adapted to operate said connection to throw the machine into and out of operation, a laterally projecting pin on said wheel, a pivoted pusher-lever, a slotted element carried by said pusher-lever in the slot of which said pin runs, and a shifting arm mounted on said shifter-bar and having an oblique nose projecting into the path of said pusher-lever at the limit of its return-movement whereby on such return-movement the shifter-arm is laterally moved carrying with it said shifter-bar and disconnecting said source of power so as to stop the machine.

28. In a machine of the class described, the combination of a rotating wheel carrying a laterally projecting pin, a pivoted pusher-lever, an auxiliary arm pivoted on said pusher-lever and having a slot in which said pin runs, gripping-means between said auxiliary arm and pusher-lever, a source of power, a longitudinally shiftable bar adapted to connect said source of power with said wheel when moved in one direction and to disconnect said source of power when moved in the opposite direction, a shifter-arm mounted on said bar and having a sliding movement in a direction transverse thereto, said shifter-arm having an oblique nose extending into the path of said pusher-lever at the extremity of its return-movement, means for depressing said shifter-arm, means for returning said shifter-arm to its raised position when released, a pawl adapted to engage said shifter-arm when depressed and hold it in depressed position, a trip lever adapted to trip said pawl when oscillated, and a tripping-device formed as an extension on said auxiliary arm adapted to oscillate said trip-lever whereby said shifter-arm is released and brought into position to be shifted by said pusher-lever on its return movement and thereby disconnect the machine from said source of power.

29. In a machine of the class described, the combination of a rotating wheel carrying a laterally projecting pin, a pivoted pusher-lever, an auxiliary arm pivoted on said pusher-lever and having a slot in which said pin runs, gripping-means between said auxiliary arm and pusher-lever, a source of power, a longitudinally shiftable bar adapted to connect said source of power with said wheel when moved in one direction and to disconnect said source of power when moved in the opposite direction, a shifter-arm mounted on said bar and having a sliding movement transverse with relation thereto, said shifter-arm having an oblique nose extending into the path of said pusher-arm at the extremity of its return-movement, means for depressing said shifter-arm, means for returning said shifter-arm to its raised position when released, a pawl adapted to engage said shifter-arm when depressed and hold it in depressed position, a trip lever adapted to trip said pawl when oscillated, a trip-device formed as an extension on said auxiliary arm adapted to oscillate said trip lever whereby said shifter-arm is released and brought into position to be shifted by said pusher-lever on its return-movement and thereby disconnect the machine from said source of power, a three-armed lever pivoted on a fixed point and having a vertical arm and two horizontal arms, the vertical arm having an operative connection with said shiftable bar, and a foot-lever pivoted on a fixed point and having a pivotal connection with one of said horizontal arms of said three-armed lever such that when said foot-lever is depressed said three-armed lever is oscillated so as to move said shiftable bar into position to disconnect the machine from operation.

30. In a machine of the class described, the combination of a rotating wheel carrying a laterally projecting pin, a pivoted pusher-lever, an auxiliary arm pivoted on said pusher-lever and having a slot in which said pin runs, gripping-means between said auxiliary arm and pusher-lever, a source of power, a longitudinally shiftable bar adapted to connect said source of power with said wheel when moved in one direction and to disconnect said source of power when moved in the opposite direction, a shifter-arm mounted on said bar and having a vertical sliding movement with relation thereto, said shifter-arm having an oblique nose extending into the path of said pusher-lever at the extremity of its return-movement, means for depressing said shifter-arm, means for returning said shifter-arm to its raised position when released, a pawl adapted to engage said shifter-arm when depressed and hold it in depressed position, a trip-lever adapted to trip said pawl when oscillated, a trip-device formed as an extension on said auxiliary arm adapted to oscillate said trip-lever, whereby said shifter-arm is released and brought into position to be shifted by said pusher-lever and thereby disconnect the machine from said source of power, a three-armed lever pivoted on a fixed point and having a vertical arm and two horizontal arms, the vertical arm having an operative connection with said shiftable bar, and a foot lever pivoted on a fixed point and having a pivotal connection with one of said horizontal arms of said three-armed lever such that when said foot-lever is depressed said three-armed lever is oscillated so as to move said shiftable bar into position to disconnect the machine from operation, said depressing-means for said shifter-arm consisting of a second pivoted foot-lever which extends over the other horizontal arm of said three-armed lever, whereby the depression of said second foot-lever acts to move said shiftable bar into position to start up the machine.

31. In a machine of the class described, in combination with a pointed spear on which plants are adapted to be impaled, said spear having a socket or rest at the end opposite the pointed end adapted to receive and support flush therewith the end of a lath on which the plants are to be spread, a fixed support for the opposite end of said lath, a plurality of yieldable supports for said spear arranged one behind the other, and a reciprocating pusher having a path of movement extending from in front of the pointed end of said spear along said spear and lath to a point near the opposite end of the lath; said pusher being adapted to press and impale a plant upon said spear and move it over and along said lath to a predetermined position on said lath, a pusher-carriage moving in parallel ways on which said pusher is mounted, and means for reciprocating said pusher-carriage.

32. In a machine of the class described, in combination with a pointed spear on which plants are adapted to be impaled, said spear having a socket or rest at the end opposite the pointed end adapted to receive and support flush therewith the end of a lath on which the plants are to be spread, a fixed support for the opposite end of said lath, a plurality of yieldable supports for said spear-head arranged one behind the other, a reciprocating pusher having a path of movement extending from in front of the pointed end of said spear along said spear and lath to a point near the opposite end of the lath, said pusher being adapted to press and impale a plant upon said spear and move it over and along said lath to a predetermined position on said lath, a pusher-carriage moving in parallel ways on which said pusher is mounted, and means for reciprocating said pusher-carriage through several successive cycles of movement in each of which its advance movement is shorter than in the preceding.

33. In a machine of the class described, in combination with a pointed spear on which plants are adapted to be impaled, said spear having a socket or rest at the end opposite the pointed end adapted to receive and support flush therewith the end of a lath on which the plants are to be spread, a fixed support for the opposite end of said lath, a plurality of yielding supports for said spear arranged when behind the other, and a reciprocating pusher having a path of movement extending from in front of the pointed end of said spear along said spear and lath to a point near the opposite end of the lath; said pusher being adapted to press and impale a plant upon said spear and move it over and along said lath to a predetermined position on said lath, a pusher-carriage moving in parallel ways on which said pusher is mounted, means for reciprocating said pusher-carriage through several successive cycles of movement in each of which its advance movement is shorter than in the preceding, means for automatically stopping said reciprocating means upon its return from the last of such cycles, and means for manually stopping said means at any desired point of the movement of said pusher.

34. In a machine of the class described, in combination with a reciprocating pusher, a pair of jaws at the starting end of the movement of said pusher adapted to seize and hold a lath thrust thereinto, means for normally bringing said jaws together, and means on said pusher adapted to cause said jaws to open as it returns to the starting position.

35. In a machine of the class described, in combination with a reciprocating pusher, a pair of toggle-jaws at the starting end of the movement of said pusher, said jaws being adapted to seize and hold the end of the lath and hold said lath in line with the movement of said pusher, and means for normally pressing said jaws resiliently together.

36. In a machine of the class described, in combination with a reciprocating pusher, a pair of toggle-jaws at the starting end of the movement of said pusher, said jaws being adapted to seize and hold the end of the lath and hold said lath in line with the movement of said pusher, means for normally pressing said jaws resiliently together, and devices on said pusher adapted to strike said jaws and force them apart as it returns to the starting position.

37. In a machine of the class described, in combination with a reciprocating pusher, a pair of toggle-jaws at the starting end of the movement of said pusher, said jaws being adapted to seize and hold the end of the lath and hold said lath in line with the movement of said pusher, and means for normally pressing said jaws resiliently together, said jaws being supported on toggle-links which act to move the jaws closer together when the lath held thereby is pulled in the direction of the pusher and adapted to open and release said lath when moved in the opposite direction.

38. In a machine of the class described, in combination with a reciprocating pusher, a pair of toggle-jaws at the starting end of the movement of said pusher, said jaws being adapted to seize and hold the end of the lath and hold said lath in line with the movement of said pusher, and means for normally pressing said jaws resiliently together, said jaws being supported on toggle-links which act to move the jaws closer together when the lath held thereby is pulled in the direction of the pusher and adapted to open and release said lath when moved in the opposite direction; in conjunction with means on said pusher adapted to strike said jaws endwise on its return movement and thereby open said jaws.

In witness whereof I have hereunto set my hand this eighteenth day of August, 1908.

CHARLES M. GULLICKSON.

Witnesses:
F. T. TERRY,
GEORGE W. COLLES.